United States Patent [19]

Cleary et al.

[11] 4,362,270
[45] Dec. 7, 1982

[54] ELECTRONIC TEMPERATURE CONTROL SYSTEM

[75] Inventors: Robert J. Cleary, Levittown; Ronald R. Chin, Flushing, both of N.Y.

[73] Assignee: Energy Master, Inc., Atlanta, Ga.

[21] Appl. No.: 971,409

[22] Filed: Dec. 20, 1978

Related U.S. Application Data

[63] Continuation-in-part of Ser. No. 798,142, May 18, 1977, Pat. No. 4,132,355.

[51] Int. Cl.³ .................................................. F23N 5/20
[52] U.S. Cl. .................................... 236/46 R; 236/51
[58] Field of Search ....................... 236/46 R, 47, 51; 165/12; 340/147 R

[56] References Cited

U.S. PATENT DOCUMENTS

| | | | |
|---|---|---|---|
| 3,306,348 | 2/1967 | Tucker | 165/12 |
| 3,972,471 | 8/1976 | Ziegler | 236/46 R |
| 3,979,060 | 9/1976 | Tierce | 236/46 R |
| 4,021,615 | 5/1977 | James et al. | 340/147 R |

Primary Examiner—William E. Wayner
Attorney, Agent, or Firm—L. Lawton Rogers, III

[57] ABSTRACT

The disclosure relates to a system for providing central control for appliances connected to the electrical power distribution network of a building. In one embodiment the systems may be used for conserving energy used by temperature regulating units, such as space heaters and air conditioning units, by overriding local thermostatic control therefor, to prevent operation of the units during preselected time periods. The system includes a transmitter for transmitting control pulses over the electrical power distribution network of the building. Receivers, connected to the local thermostatic controls, detect the pulses and shut off the electrical power provided to the thermostatic controls responsive to the detected pulses to thereby prevent operation of the associated temperature regulating units. In one embodiment the control pulse transmitter operates responsively to signals transmitted over a coaxial cable such as employed in cable television systems.

1 Claim, 11 Drawing Figures

ELECTRONIC TEMPERATURE CONTROL SYSTEM

RELATED APPLICATION

This is a continuation-in-part of application Ser. No. 798,142, filed May 18, 1977, now U.S. Pat. No. 4,132,355.

BACKGROUND OF THE INVENTION

In certain factory and office building, circuits for operating heating and air conditioning apparatus for various parts of the building are controlled by conventional individual thermostats which have a limited range of adjustment. Thus, the lowest adjustment for the control for heating apparatus may be 50° F. in work or office space. Also, while apartments, motels and like buildings generally are arranged permitting localized adjustments of the controlled temperatures in the individual units, the occupants of the units may be unwilling to adjust the controls to lower the heating temperatures or raise the cooling temperatures such as is now considered necessary for energy conservation, particularly during all or some of the night hours. In some of these locations, such as work space in a factory building, it may be desirable and perfectly safe when the space is not being used to maintain certain heating apparatus off for so long as the inside temperature exceeds 40° F. In apartments and like buildings, overriding the occupants' adjustments of controls for heating and air conditioning apparatus from remote locations may be necessary to insure that an appropriate temperature limit is imposed.

While the problem has been generally recognized, previous solutions generally have involved the high cost of providing separate additional control wiring and other equipment and of installing that equipment. Thus, some prior systems have employed low voltage cables, thereby eliminating the need to install protective conduits or large gauge wiring. Other prior systems used multiplexing to combine all their signals onto a few coaxial cables. But the need to use additional wiring and for sophisticated multiplexing equipment was not eliminated thereby.

A known control system, such as illustrated in U.S. Pat. No. 4,021,615 to James et al overcomes the need for providing additional building wiring by transmitting control pulse bursts over existing telephone lines. The system has disadvantages inter alia that (1) the transmitting control circuitry must be tapped into each phone line at the branch exchange; (2) the system receivers must be tapped into the phone lines at each remote location; and remote receivers can only be located in areas of the building served by phone lines, typically less than all of the building.

Accordingly, it is an object of the present invention to provide a wireless control system for electrical apparatus, which system utilizes the same wiring used to connect the apparatus to the electric supply.

It is another object of the present invention to provide a temperature control system wherein control signals are conveyed to temperature controlling apparatus over electric power line wiring for the enclosure having its temperature controlled.

It is still another object of the invention to provide a temperature control system including a master transmitter for applying control signals determined by temperature and time at a master location to power lines for transmission thereby to receivers at the location of controlled apparatus along the power lines.

It is known in the prior art that remote appliances may be controlled from a central installation responsive to control signals transmitted from the central installation over telephone lines coaxial cable normally employed for cable television broadcasts. In such prior art systems the control signal is detected by a local detector directly connected to the appliance which is controlled thereby. Such a system has the disadvantage, inter alia, that each local detector must be connected to the coaxial network or telephone line and each controlled appliance must be hard wired to a detector.

Accordingly, it is an object of the present invention to provide a control system wherein control signals are transmitted to remote appliances such as heating and cooling units, security devices, fire alarms, etc. in a location served by a coaxial cable or telephone network, and the appliances are controlled responsive to the detection of signals transmitted to a local detector by a coaxial cable network, without requiring that new wiring be used to connect the detector and appliance.

These and other objects and advantages of the present invention will be apparent from the claims and from the following detailed description when read in conjunction with the appended drawings.

THE DRAWINGS

THE DETAILED DESCRIPTION

Figure 1:
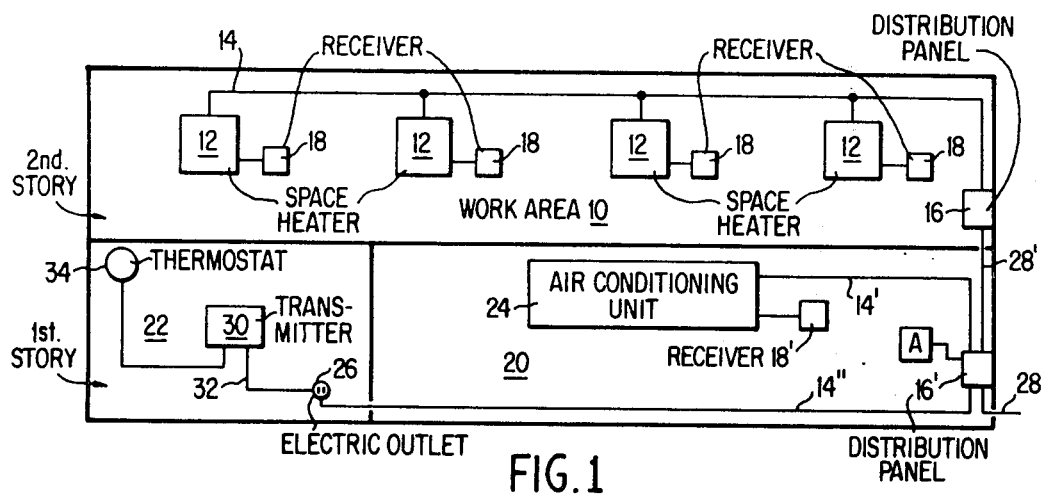
FIG. 1 is a diagrammatic view of a control system in accordance with the present invention for controlling temperatures in two-story building shown in vertical cross section.

FIG. 1 is a schematic diagram showing the wireless control system of the present invention adapted for off hours or night time control of temperature regulating units for a structure such as space heaters and air conditioning units. Although an embodiment of the present invention is described in connection with the particular structure shown in FIG. 1 having heating and cooling equipment in particular locations, it will be understood that the present invention may be adapted to control heating and/or cooling equipment in structures of virtually any size, configuration and use.

General work area 10 on the second story of the building is shown provided with four space heaters 12. These heaters may be powered by electricity or some other fuel such as gas. In either case, each of the space heaters 12 is preferably provided with an automatic thermostatic temperature control circuit of a usual type connected through electric power line 14 from a power distribution panel 16 for normally maintaining the temperature of the area at an appropriate working temperature. Also, each heater is provided with a control receiver 18 which reacts to control signals received over the line 14 in a manner to be described later.

The first story of the building includes an office area 20 and a control room 22. An air conditioner unit 24 in the office space is energized through electric power line 14' from a power distribution panel 16'. Air conditioner unit 24 is connected to a control receiver 18' which may be controlled by a control signal imposed on power line 14' in a manner hereinafter described. Such an air conditioner unit will normally be provided with a built-in automatic thermostatic temperature control of a usual type.

A power outlet 26 in the control room 22 is connected by power line 14" to the distribution panel 16'. The outlet 26 may be a usual standard 110 volt outlet originally provided for the general use i.e., for receiving the connector plug from a 110-117 volt, 60 Hz electrical appliance. It will be noted that the power lines 14, 14' and 14" are energized from the same power line source through service conductors 28 which supply distribution panel 16' and, through it and conductors 28', distribution panel 16. The building will ordinarily be such that a three phase power supply is provided, although concepts of the invention are applicable to single phase suppliers as well. A control transmitter 30 may be located in a control room 22 and be provided with conductors 32 connecting it to outlet 26. The transmitter 30 is also connected to a master thermostat 34. The thermostat may be located at a window of the building for exposure to a temperature approximating that of the coldest portion of the building. The control transmitter and master thermostat will be described in detail in connection with FIG. 3.

Figure 2A:
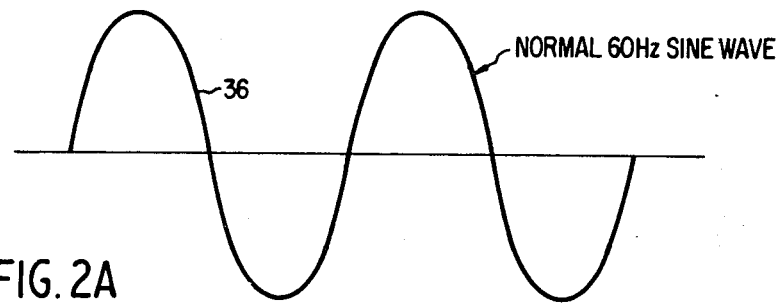
FIGS. 2a and 2b are, respectively, views of a pure sine wave power voltage signal and of the same signal with control pulses of a preselected frequency imposed thereon in accordance with the present invention.
Figure 2B:
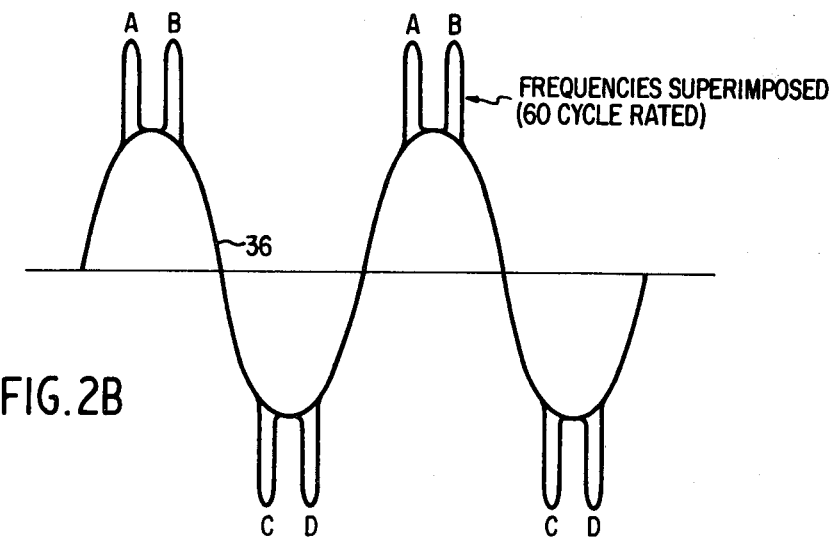

The control transmitter may be operative to impose control pulses on the electrical distribution network of the building. FIG. 2a represents a theoretically pure sine signal 36 which is normally carried by the power lines 14, 14' and 14" and may be 60 Hz, at 110-117 volts. The same sine wave 36 with control pulses A, B, C, and D imposed thereon is shown in FIG. 2b. The signals A, B, C, and D represent signals coupled to power line 14", and hence to the rest of the interconnected network including lines 14' and 14, by control transmitter 30 to selectively operate control receivers, such as 18 and 18' in FIG. 1. The heating units are actuated on the occurrence of predetermined conditions at thermostat 34 and at preselected times. An example of such circumstances may be that the heating units are operated when a temperature of less than 40° F. is detected by thermostat 34 between the hours of 7:00 p.m. and 7:00 a.m. when the building is ordinarily not in use.

Figure 3A:
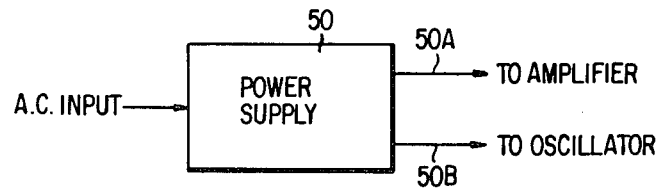
FIG. 3a is a wiring diagram of a power supply circuit for the transmitter of FIG. 3.
Figure 3:
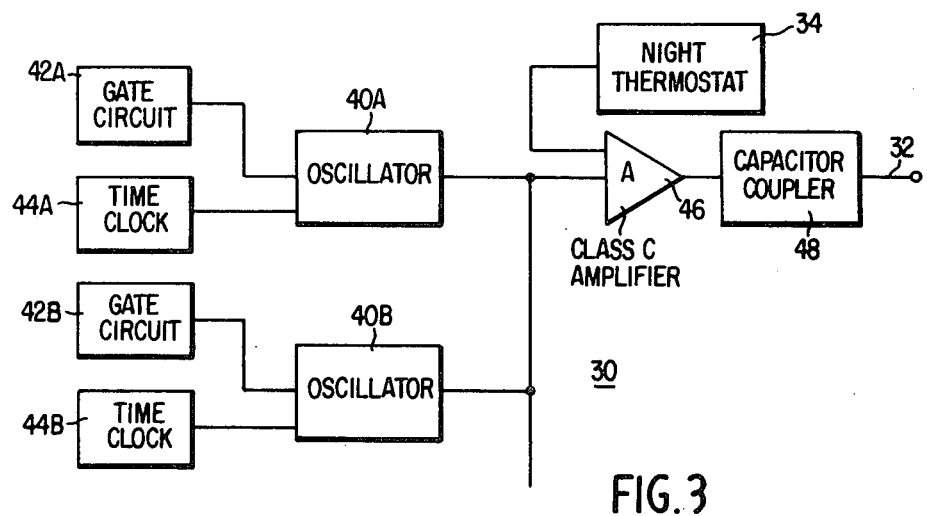
FIG. 3 is a wiring diagram of a control signal master transmitter in accordance with the present invention.

Referring particularly to FIG. 3, the control transmitter 30 as shown includes two controlled oscillators 40A and 40B, operative at a frequency greater than the frequency of the electrical power supply network. The oscillators are controlled by gating circuits 42A and 42B with a 60 Hz repeat rate to correspond to the 60 Hz frequency of the power supply network as indicated by sine wave 36 of FIGS. 2a and 2b. Additionally, 7-day electromechanical or electronic timers 44A and 44B are connected to oscillators 40A and 40B, respectively, to control the time periods during which the oscillators are on or off. The outputs of the crystal oscillators are connected to a class C amplifier 46. The on-off operation of the class C amplifier 46 is controlled by the night thermostat 34. Advantageously, this thermostat may be a conventional bimetallic thermostat. The thermostat ensures fail-safe operation in the preselected temperature range, as in the 40° F. range where the space heaters 12 are to be cut off as in the example previously mentioned. The output of amplifier 46 is coupled by a capacitative coupling circuit 48 through conductors 32 to the power outlet 26 (FIG. 1).

Considering again the example of employing the invention to bar operation of space heaters 12 when the temperature at the thermostat 34 is above 40° F. between 7:00 p.m. and 7:00 a.m., the oscillator 40A is designed to oscillate at the frequency to which the receivers 18 respond, and the time clock 44A sets the oscillator 40A in the night set mode to permit its operation during the prescribed period. The night thermostat 34 then acts through amplifier 46 to insure fail-safe operation of the night set back at the 40° F. setting. Alternatively the transmitter may be controlled by manual switches at a central location such as a hotel desk in place of the electromechanical time clock. For instance, another example would be a master transmitter with 100 control frequencies located in the front desk of the hotel lobby with each of the 100 rooms having a corresponding receiver which will respond to a clerks command. The receiver in return will energize or de-energize the air conditioning or heating units.

FIG. 3a shows a conventional direct current power supply unit 50 connected for energization from the power line at 110-117 volts to supply the B+ voltage for the oscillators and amplifier of the transmitter. This direct current output voltage, which is preferably about 165 volts, is supplied through output conductors 50A and 50B.

Figure 4:
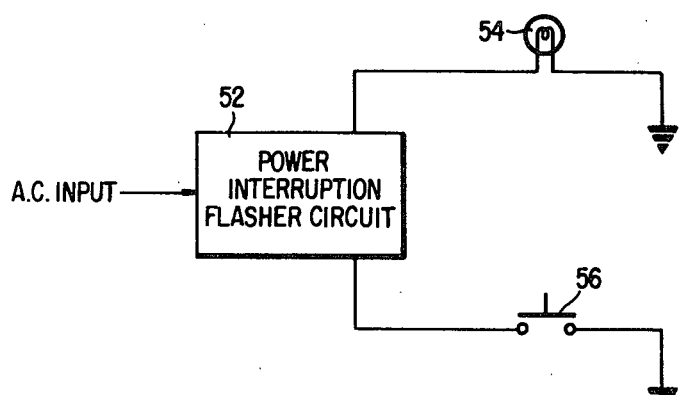
FIG. 4 is a wiring diagram of a current interruption indicator circuit for use in the present invention.

FIG. 4 shows a power outage indicator circuit which, for convenience, is preferably located in the vicinity of the transmitter 30. The outage indicator circuit includes a power interruption flasher circuit 52 connected to the power line or network in the building to cause a lamp 54 to flash to indicate when a power outage has occurred. This signifies that resetting of the 7-day timers 44A and 44B is probably necessary. The outage indicator circuit may be reset by momentary closure of a reset switch 56.

Figure 5:
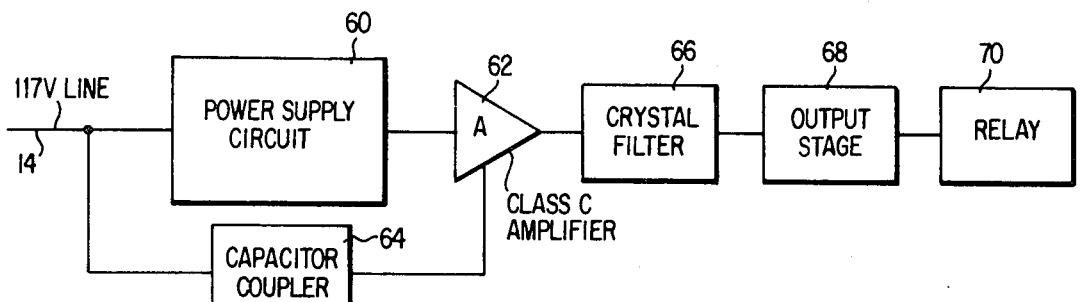
FIG. 5 is a diagram of a control signal receiver in accordance with the present invention.
Figure 6:
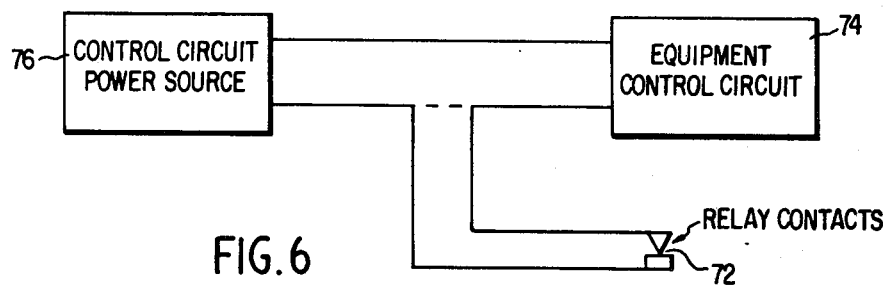
FIG. 6 is a wiring diagram showing the connection of the relay of FIG. 5 to the control circuit, for the temperature regulating apparatus; and, FIG. 7 is a wiring diagram of a circuit for connection to a three phase electric power distribution panel in accordance with the present invention.

A receiver, such as the receiver 18 for controlling a space heater 12 of FIG. 1, is illustrated in detail in FIG. 5. Connected to power supply conductors 14 of the space heater is a power supply circuit 60 supplying direct current B+ voltage to a class C amplifier 62. The power conductor 14 is also connected through capacitative coupling circuit 64 to supply the amplifier 62 with the sine wave line signal 36 (FIG. 2b), including whatever control pulses A, B, C, and D have been imposed thereon by transmitter 30. The output of the amplifier is fed to a crystal filter 66 which passes only pulses derived from that one of the transmitter outputs having the preselected frequency to which the particular receiver is to respond to produce a bias current. Alternatively, the receiver may be responsive to a particular address code composed of two or more tones imposed on the electrical distribution network. The bias current is applied to an output stage 68 which may include a conventional switching transistor which is gated to operate a conventional relay 70. Operation of relay 70 opens contacts 72 shown in FIG. 6 as connected in series with existing equipment control circuit 74 and the control circuit power source 76. Opening of the receiver relay contacts 72 thus renders the equipment control circuit inoperative. In the specific example given, when the control circuit is disabled, the space heater 12 becomes inoperative. Similarly, pulses from an oscillator in the transmitter, producing pulses of the frequency to which the receiver 18′ for the air conditioning unit 24 responds, will serve to render the existing control circuit for the air conditioning unit inoperative. When the transmitter discontinues production of corresponding control pulses on the power line or network, the receiver relay 70 is rendered inoperative and the contacts 72 close to place the existing equipment control circuit in command.

Figure 7:
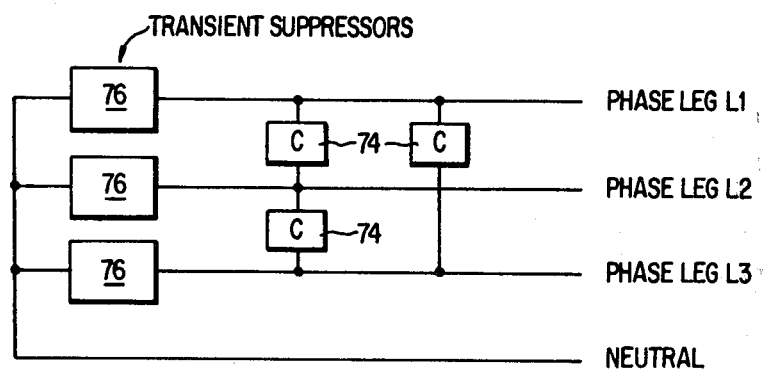

Turning to FIG. 7, conventional capacitors 74 are connected in series across the respective pairs of the three phase legs of the power supply at the power distribution panels. Also a transient suppressor 76, which may be of conventional solid state construction, is provided in series in each phase line L1, L2 and L3 to neutral. In a preferred embodiment the capacitors may be provided to assure circuit continuity for the transmitted control signals throughout the electric power network for those networks with more than one phase leg. The transient suppressors are provided to protect against power spikes and transients falsely triggering the receiver units.

Summarizing the operation of the present system, the pulse gating circuits 42 turn on the oscillators 40A, 40B, etc. of the transmitter 30 at a 60 Hz repeat rate only during the period of time selected by the corresponding time clock 44A, 44B, etc. Thus four pulses of four different frequencies, corresponding to A, B, C, and D of FIG. 2b may be transmitted on the power line when four oscillators are employed. The pulses A may control all four space heaters 12 in the work space if desired. However, if different heaters are to be rendered inoperative at one selected thermostat temperature but for different hours of the day, the different time clocks 44A, 44B etc. may act through different frequency oscillators to provide different signals for controlling the different heaters.

Where different temperatures are to be the controlling conditions, as where control of air conditioners is included in the system, switching means may be provided to permit selective substitution of a thermostat having different characteristics for that shown at 34 in FIG. 3. Alternatively, the transmitter 30 may be duplicated with a different thermostat and the outputs of both transmitters simultaneously applied to the wiring network to provide pulses with different frequencies to receivers controlling different devices.

It will appear from the foregoing description, that the system is readily adaptable to control different combinations of heaters, air conditioners, ventilators and other equipment than are described in detail.

Figure 8:
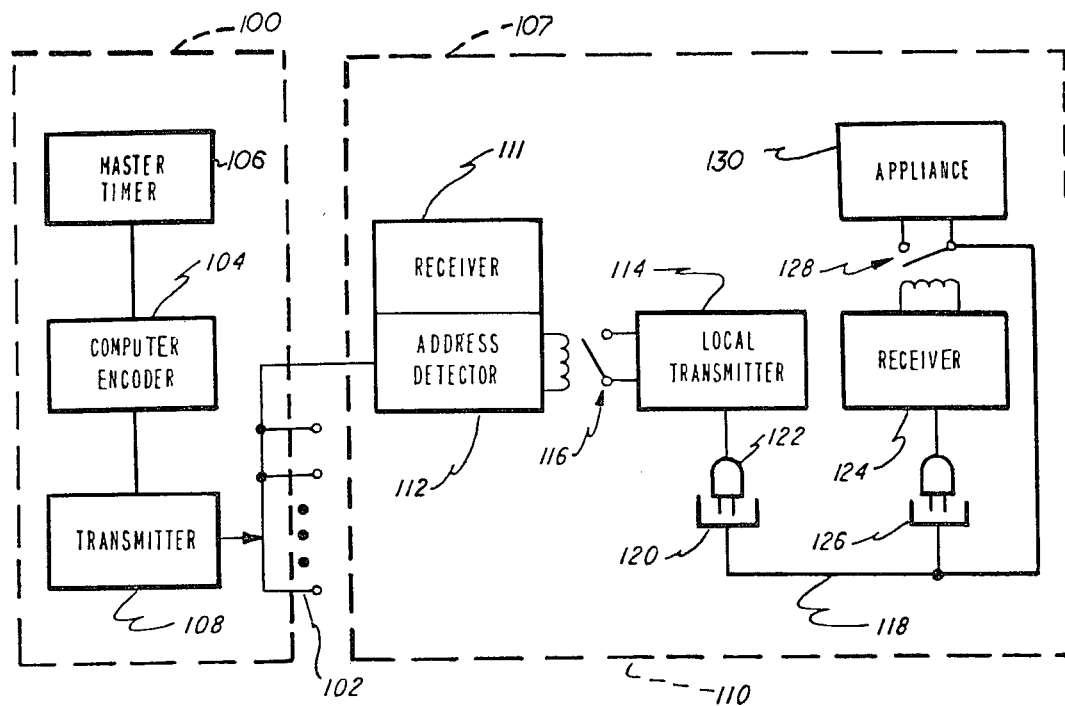
FIG. 8 is a schematic block diagram of a control system in accordance with the present invention in which a local appliance is controlled by signals transmitted from a central control installation over coaxial cable.

FIG. 8 is a schematic block diagram showing a control system employing a coaxial cable network 102 to transmit control signals from a central control installation 100. In a preferred embodiment the central control installation 100 may be located at a cable television transmission facility.

The central control installation 100 may include a general purpose computer encoder 104 which operates responsively to a master timer 106 and responsively to keyboard programmed parameters relating to the desired turn-on and shut-off times for appliances at a remote location 107, connected to the coaxial cable distribution network 102. A radio or television frequency transmitter 108 is operated responsively to the computer encoder and broadcasts control signals over the coaxial cable distribution network at one or more assigned frequencies. The broadcast signal may include an address portion and a data signal portion. The address portion may uniquely identify a particular remote location 107, and the data signal portion may include data for selectively controlling particular appliances at the remote location, or controlling particular functions of appliances at the remote location.

A typical appliance installation, located remote from the central control installation, is denoted generally by the numeral 110. In a preferred embodiment the installation 110 could be the residence of a cable television subscriber or one of a series of rooms or apartments connected to a cable television system or common antenna system.

The local installation may include a radio or television frequency receiver 111 connected to the coaxial cable distribution network. Control signals intended for the particular remote installation may be identified by a suitable conventional digital address detector 112. A local transmitter 114 is operated responsively to the address detector 112. In the embodiment shown in FIG. 8 the local transmitter is selectively energized by a relay 116, responsive to the receipt of the appropriate address signal by the receiver 111.

The electrical distribution network at the remote installation is denoted by the numeral 118. Typically, the electrical distribution network is ordinary house wiring having outlet receptacles such as shown at 120 and 126. The local transmitter may be connected to the electrical distribution network by means of a power cord and plug 122. The local transmitter 114 may impose a control signal onto the electrical power distribution network 118 via the power cord and plug 122. Advantageously, the local transmitter may superimpose a control frequency onto the 50 or 60 hertz, 120 or 240 volt power wave form of the electrical distribution network 118, in the manner discussed in connection with FIGS. 2 and 3.

The signals imposed on the electrical power distribution network 118 may be detected by a receiver 124 which may be connected to the electrical power distribution network at another outlet receptacle 126. The receiver 124, in turn, may operate a relay 128 which controls the power supplied to an electrical appliance 130. In a preferred embodiment of the present invention, the appliance 130 may be a heating or cooling unit normally controlled by a local thermostat. However, the system may be advantageously employed with any power consuming appliance. Moreover, the system may be used to regulate low power appliances, which require some centralized control such as rental televisions for motels, burglar alarms, etc. Alternatively, the techniques of the present invention may be used in a bidirectional coaxial cable or telephone line network. In such a system information could be sent from a local transmitter to the central control installation. For example, a fire detector could broadcast an alarm signal over building power lines to a local transmitter, which would, in turn, relay the alarm signal over the coaxial cable or telephone line network to the central control installation where appropriate action could be taken such as calling the fire department.

Figure 9:
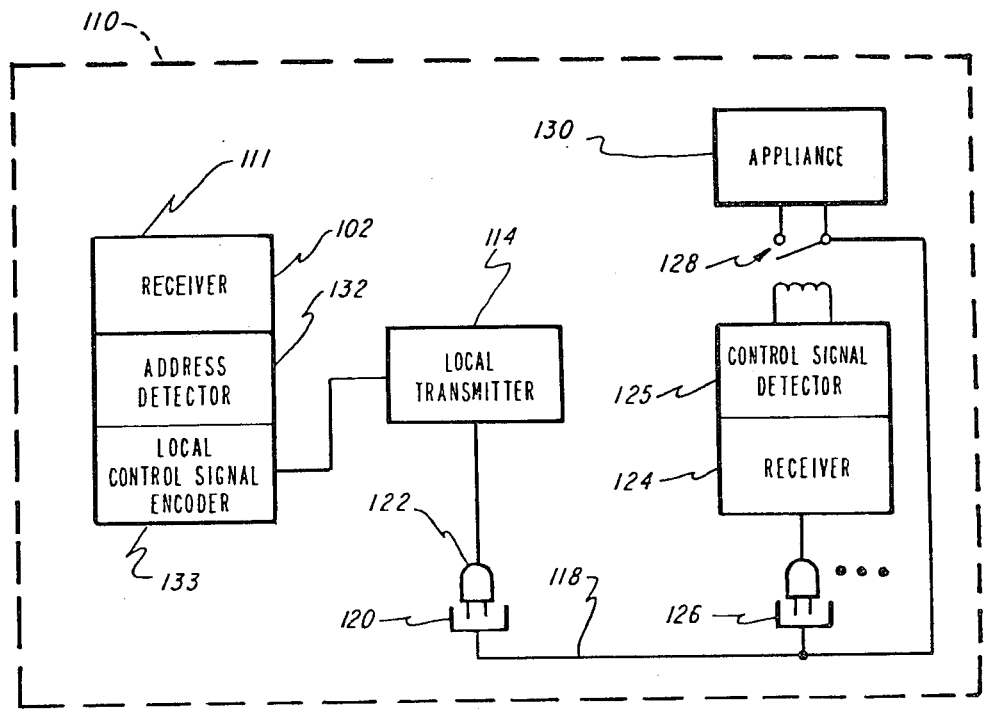
FIG. 9 is a schematic block diagram of a alternate arrangement of the local detection and control system shown in FIG. 8.

In FIG. 9 an alternate embodiment of the local installation shown in FIG. 8 is depicted wherein like numerals are employed to indicate like structure. In the embodiment of FIG. 9 the conventional receiver 111 is connected to the coaxial cable distribution network 102. The receiver is connected to an address detector which identifies control signals intended for the particular local installation. Such control signals are passed to the local control signal encoder which supplies a control signal suitable for transmission by the local transmitter 114. The local transmitter, in turn, transmits the control signal over the electrical power distribution network 118 in the manner described above. The control signals are received by receivers such as receiver 124, and particular control signals intended to control the appliance associated with the receiver, are recognized by the control signal detector 125. When such a control signal is recognized, the relay 128 may be opened or closed to control the operation of the appliance 130.

The system described in connection with FIGS. 8 and 9 operates as follows. A system subscriber may communicate data to the central control installation concerning the timing sequence in which the local subscriber wishes his appliances to be operated. For example, the subscriber may telephone the central control installation and direct the computer encoder 104 to disable certain of his electrical appliances at the local installation during the night hours. Accordingly, when the master timer 106 indicates that a prescribed turn-on or shut-off time has been reached for particular subscriber, the computer encoder may generate an address signal unique to that subscriber and the transmitter 108 may broadcast that address signal over the coaxial distribution network 102. At the local installation 110, a received address signal unique to the installation 110 may be detected by the address detector 112 of FIG. 8 or the address detector 132 of the system of FIG. 9. In response to the detection of the address unique to the installation 110, the relay 116 of FIG. 8 may be operated to actuate the local transmitter 114. In the system shown in FIG. 9 the recognition of the address signal unique to the local installation permits the local control signal encoder to evaluate a data portion of the received signal and generate a control signal for the local receiver 114 responsively thereto. The control signal may then be transmitted over the electrical distribution network 118. The control signal detector 125 may be operative to detect specific ones of the control signal transmitted by the electrical power distribution network 118 intended for the particular appliance with which the receiver is associated. In response to detection of particular control signals, the control signal dector 125 may operate a relay 128 which controls the appliance 130.

The principles, preferred embodiments and modes of operation of the present invention have been described in the foregoing specification. The invention which is intended to be protected is not, however, to be construed as limited to the particular forms disclosed, since these are to be regarded as illustrative rather restrictive. Variations and changes therefore may be made by those skilled in the art without departing from the spirit and scope of the present invention.

What is claimed is:

1. A control system for a plurality of temperature controlling devices, each of which is disposed in a structure and is connected to an existing electrical power distribution network and each including a control circuit responsive to temperature conditions at a location in said structure to connect the device to the electrical conductor network for energization, comprising:

a control transmitter responsive to each of a plurality of combinations of temperature and the passage of preselected periods of time to impose electrical pulses of different predetermined control frequencies on said conductor network at a pulse rate corresponding to the power supply frequency, said transmitter including:

a plurality of fixed frequency oscillators each operable at a frequency greater than the power supply frequency, first gating circuit means for permitting each of said oscillators to provide pulses at a rate corresponding to the power supply frequency, a time clock connected to each of said oscillators to prevent oscillation of the oscillator except at a time period determined by the time clock, a master thermostat for monitoring temperature within the structure, and a second gating circuit means for imposing said oscillator pulses on said conductor network responsive to the temperature monitored by the master thermostat; and, a receiver associated with each of said plurality of devices responding to the presence of pulses of a different one of said predetermined control frequencies to render the control circuit for the device inoperative.

* * * * *